United States Patent Office.

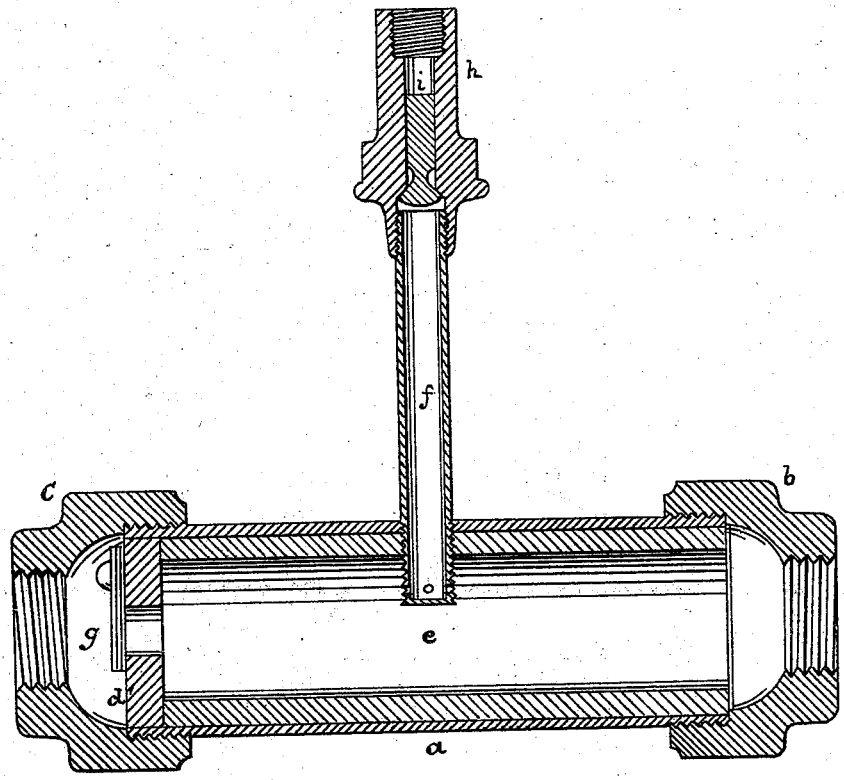

THOMAS SHAW, OF PHILADELPHIA, PENNSYLVANIA.

*Letters Patent No. 95,275, dated September 28, 1869.*

IMPROVEMENT IN CONDENSERS.

The Schedule referred to in these Letters Patent and making part of the same.

*To all whom it may concern:*

Be it known that I, THOMAS SHAW, of the city and county of Philadelphia, Pennsylvania, have invented a new and improved Method of Condensing the Exhaust-Steam of High-Pressure Engines; and I hereby declare the following to be a full, clear, and exact description of the same, reference being had to the accompanying drawing, and to the letters of reference marked thereon.

My invention consists in connecting a condensing-chamber with the exhaust-pipe of the engine, in such a manner that the first rush of steam shall clear the chamber of air and water, (that the air-pump may be dispensed with, and the apparatus simplified and cheapened;) also, in the arrangement of injector and valves, in the manner and for the purpose as hereafter described.

In order to enable others to use and practise my invention, I will proceed to describe its construction and operation.

On reference to the accompanying drawing, which forms part of this specification, the sketch represents a longitudinal vertical section, through the centre of condenser, of which $a$ is a metal tube, provided with sockets $b$ and $c$. Said tube $a$ has a partition across one end, $d$, provided with an aperture covered by a gum-valve, $g$, and is lined in the interior with a wood-tube, $e$, (as a non-conductor of heat,) and has inserted in the middle part an injecting-tube, $f$, bored with small apertures on the inner end for the injection of a spray of water, and with a common valve, $i$, secured in socket $h$, opening inward, all for the purpose as hereafter described.

The socket $b$ is connected by a pipe with the exhaust part of the engine, and the socket $c$ is connected by a pipe with a tank for the collection of hot water from the condensed steam; and the socket $h$ is connected by a pipe with a pump, or elevated tank, for the purpose of conveying cold water to the injecting-tube $f$, under a pressure one-half less than the highest pressure of the exhaust-steam.

The exhaust-chamber is made sufficiently small, that the first part of the exhaust is certain to blow through it, in order to eject the air and water.

The condensing-chamber works in this wise:

The steam from the exhaust rushes into and through the chamber, and all that passes out of valve $g$ is not allowed to return by reason of said valve; and in the act of rushing through the chamber, the air and water previously contained therein is ejected through the valve $g$, so long as there is any pressure in said chamber.

In the mean time, the valve $i$ is closed by virtue of the pressure within the chamber, and the cold water is prevented from entering said chamber, so long as the pressure of steam is above that of the column of water, which, however, is for a very temporary period, only during the first flash of steam, after which the injector spurts, and condenses the remaining steam, when the operation is repeated, as before described.

It will be observed that the apparatus need not be of the precise form and shape here shown, but can be considerably modified without any alteration in the result.

The object of the invention is to furnish a cheap, reliable condenser for high-pressure engines, in order to increase their power, and to allow the exhaust-steam to be forced back in the boiler in the shape of hot water, to save all that heat, and to have the engine operated with less noise.

What I claim, and desire to secure by Letters Patent, is—

The construction of the described condenser on high-pressure engines, in the manner substantially as set forth.

THOMAS SHAW.

Witnesses:
E. COBB,
ELIAS J. SHAW.